United States Patent [19]

Kraft et al.

[11] 3,815,026

[45] June 4, 1974

[54] RADAR ALTIMETERS FOR AUTOMATIC LANDING SYSTEMS

[75] Inventors: Sidney Kraft, Bronx, N.Y.; Francis R. Preston, Le Lac Aurille, France

[73] Assignee: The United States of America as represented by the Secretary of the Air Force, Washington, D.C.

[22] Filed: Nov. 15, 1971

[21] Appl. No.: 88,354

[52] U.S. Cl. .............................. 324/103 P, 324/128

[51] Int. Cl. .............................................. G01r 19/16

[58] Field of Search ............ 324/128, 103 P, 103 R, 324/102

[56] References Cited

UNITED STATES PATENTS

| | | | |
|---|---|---|---|
| 3,405,358 | 10/1968 | Cropper | 324/103 R |
| 3,564,287 | 2/1971 | Todd | 324/103 P |
| 3,593,133 | 7/1971 | Wisner | 324/103 R |

*Primary Examiner*—Alfred E. Smith
*Assistant Examiner*—Ernest F. Karlsen
*Attorney, Agent, or Firm*—Harry A. Herbert, Jr.; Henry S. Miller, Jr.

[57] ABSTRACT

An improvement on radar altimeters particularly as used in automatic landing systems where the altimeter will read only decreasing altitude and remain constant for increases in altitude caused by terrain variations, the result is accomplished by providing a lag network to allow the sensing of an increasing or decreasing altitude signal, an electronic switch is operated from the output of a differential amplifier cutting off the input on an increasing altitude signal. The altimeter is governed by an isolation amplifier controlled by the input signal and lag network.

1 Claim, 2 Drawing Figures

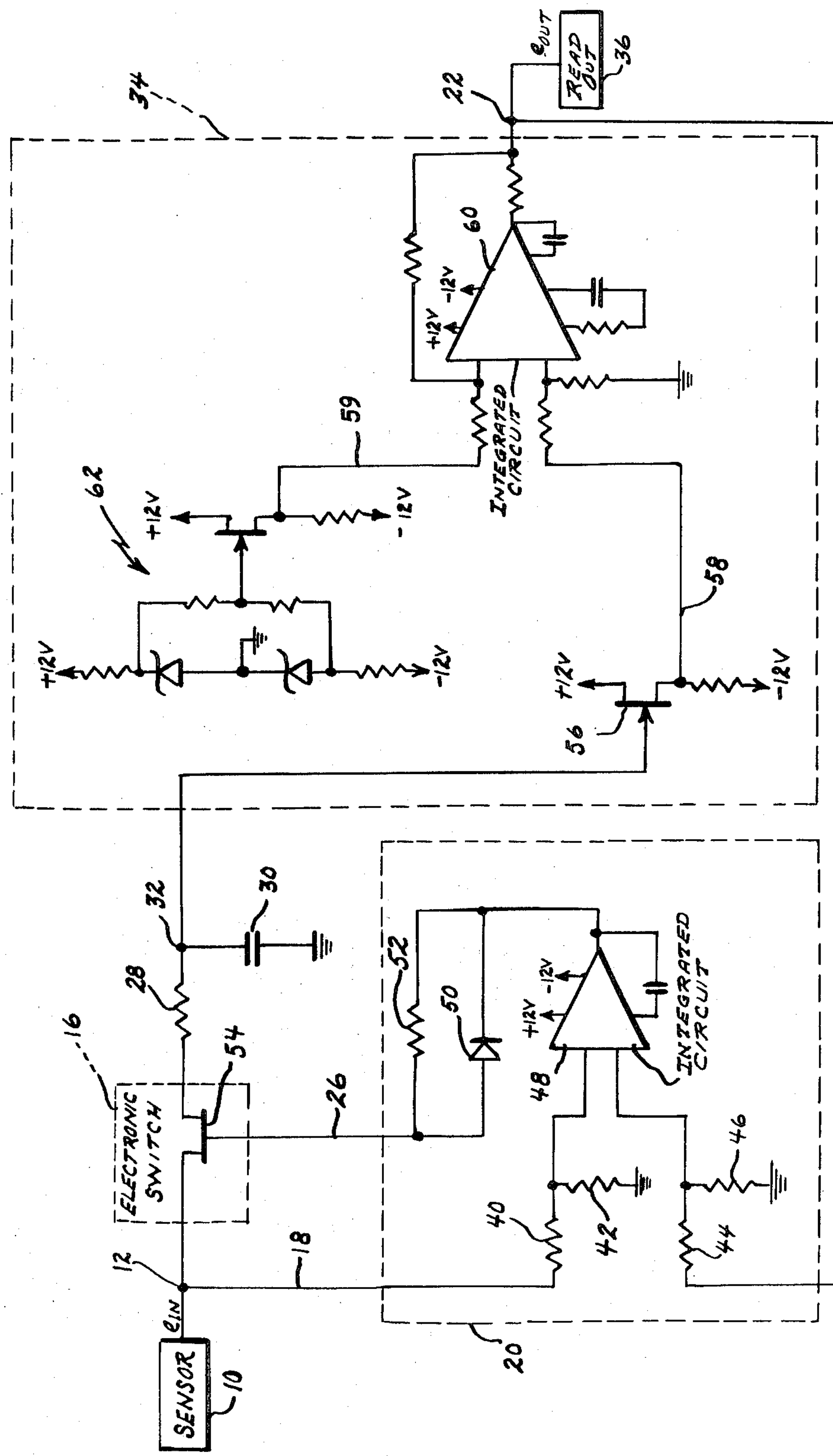

RADAR ALTIMETERS FOR AUTOMATIC LANDING SYSTEMS

BACKGROUND OF THE INVENTION

This invention relates generally to all weather landing systems for aircraft and in particular to radar altimeters for use in such a system.

With the increased utilization of all weather aircraft, and the extended ranges of newer jet aircraft, there has developed an important need for an improved all weather landing system. Presently, inter-continental aircraft may plan to arrive at a particular destination in good weather, however, because of the distances and times involved weather factors may be changed drastically. With the advent of the superjet transport, it will not be always possible for the aircraft to locate a landing area having acceptable weather conditions nearby. As a result, it is becoming mandatory that all weather landing systems provided a completely automatic landing system.

One of the most important factors in any landing system is the altitude. It is absolutely essential that the pilot and ground control know the altitude of the aircraft at all times. With conventional barometric altimeters, many inefficiencies have been found which preclude its use in an automatic landing system. Barometric altimeters are effected by rapid changes in atmospheric pressure and respond relatively slowly to small changes in altitude. To replace the barometric altimeter, a radar altimeter has been devised which accurately measures the altitude regardless of the atmospheric pressures. Such systems are extremely accurate and provide fast response. The radar altimeter, however, has the disadvantage of over-sensitivity at low altitude such as are encountered in landing approaches. Should drastic changes occur in the topography as the aircraft is at low altitude, as when approaching landing strips, the aircraft automatic landing system may make violent maneuvers in an effort to follow the contour of the land. An example of such a maneuver would be an aircraft approaching a landing strip having a canyon located across the flight path, a relatively short distance away from the strip, the automatic landing system through its altimeter would sense that the aircraft is approaching the landing strip at too high an altitude and would make a corresponding correction to decrease the altitude, as the aircraft rapidly lost altitude one of two situations would occur: first, if the canyon was wide enough the aircraft would strike the canyon wall before the aircraft could gain sufficient altitude to clear it, or second, if the canyon was too narrow the aircraft would be thrown upward when the altimeter senses the altitude as being too low on the farside of the canyon. In either case, the automatic landing system would fail to perform properly.

The instant invention remedies the aforementioned defects in the presently known automatic landing systems by providing an altimeter which will provide an accurate reading for decreasing altimeter signal and remain constant for an increasing radar altimeter reading.

SUMMARY OF THE INVENTION

The device provided in this invention is adaptable to be used with a radar altimeter particularly in an automatic all weather landing system. The invention, in a new and novel manner, allows a conventional radar altimeter to follow a decreasing radar altimeter signal but will not follow an increasing radar altimeter signal. The affect of the invention on a conventional radar altimeter is to cause the altimeter to act in the same manner as a mechanical ratchet wheel acts in a mechanical device. The ratchet wheel will provide a force in one direction wh1le turning freely in the opposite direction, similarly the circuitry of this invention can be properly called an electronic ratchet. The invention will accurately pass a decreasing altimeter signal directly to the altimeter readout but will open cicuit an increasing radar signal and thereby causing the altimeter readout to remain constant.

An increasing radar altimeter signal while landing could be caused by uneven terrain and abnormal depressions in the true characteristics of the surface topography as an aircraft approaches a runway. By eliminating such indication of an increase, i.e., an altitude caused by the ground dropping away from the aircraft, rather than by any actual increase in altitude, the altimeter will provide a truly accurate indication of that portion of the flight path as an aircraft approaches a landing strip. The invention consists of a voltage control switch which through the appropriate circuitry is closed if the input signal is decreasing and conversely open if the input is increasing indicating a gain in altitude.

It is, therefore, an object of this invention to provide a new an improved radar altimeter.

It is another object of this invention to provide a new an improved radar altimeter for automatic landing systems.

It is a further object of this invention to provide a new an improved radar altimeter that provides true altitude reading at ay given instant of time.

It is still another object of this invention to provide a new and improved radar altimeter that will not react to abnormal terrain depressions along the flight path of landing aircraft.

It is still a further object of this invention to provide a new and improved radar altimeter that will remain constant when sensing increases in altitude during automatic landing approaches.

It is another object of the invention to provide a radar altimeter which is economical to produce and utilizes conventional, currently available components that lend themselves to standard mass production manufacturing techniques.

These and other advantages, features and objects of the invention will become more apparent from the following description taken in connection with the illustrative embodiments in the accompanying drawings.

DESCRIPTION OF DRAWINGS

FIG. 2 is a detail circuit diagram of the invention.

DESCRIPTION OF PREFERRED EMBODIMENT

Figure 1:
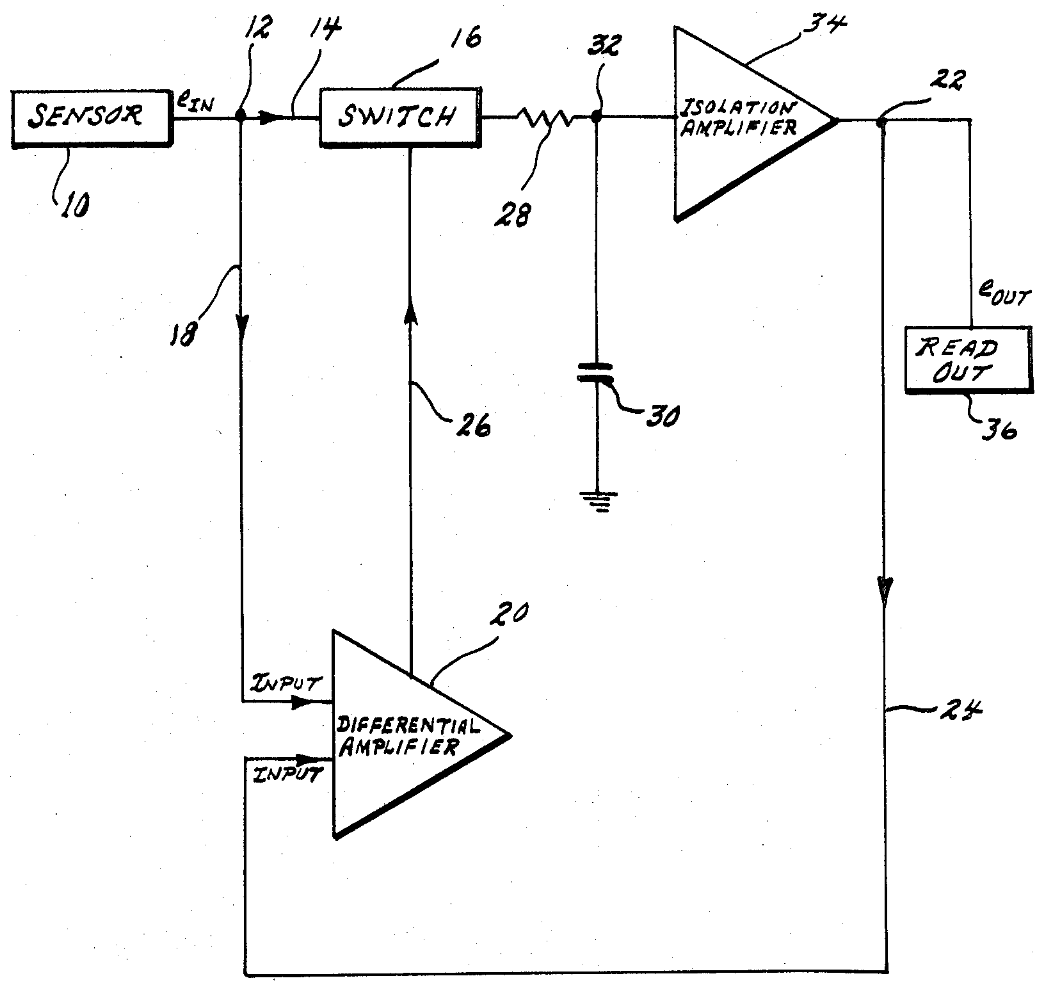
FIG. 1 is a block diagram of the system included in this invention.

Referring now to FIG. 1, a radar pulse signal is generated in the radar altimeter or sensor 10. The return radar pulse signal is sent from the altimeter in the form of a voltage $e_{in}$ to a point 12 where it is divided and sent via line 14 to the voltage controlled switch 16 and via line 18 to a high gain differential amplifier 20. The differential amplifier receives a second input from point 22 via line 24 and produces an output at 26 which controls the electronic switch 16. The output of switch 16, which is the signal from the radar altimeter 10, passes through a lag network comprising the resistor 28 and capacitor 30 connected at point 32. The signal then enters the isolation amplifier 34 and passes to the altimeter readout 36 as an output voltage $e_{out}$.

Concerning FIG. 2, the resistor 28 and the capacitor 30 constitute a lag network. If the voltage input to the lag network from the altimeter sensing unit 10 is a negative ramp, the voltage output of the lag will always be greater than the input and conversely if the voltage input to the lag network is a positive ramp, the voltage output of the lag will be smaller than the input. Hence, the input and output network can be sensed and a determination made as to whether the input signal is increasing or decreasing. The differential amplifier 20 forms an amplitude sensor and switch driver. The amplifier 20 receives the input signal voltage $e_{in}$ via line 18 and the output voltage $e_{out}$ via line 24. The voltages pass through their respective matching resistors 40, 42 and 44, 46 and enter the integrated amplifying circuit 48.

The difference voltage is sent to the diode 50 and resistor 52 whereby a negative voltage will pass through the diode closing the switch 16 which is the field effect transistor 54. A positive voltage will be blocked by the diode and reduced by the high resistance 52 to a point where it will effectively open the switch. The switch 16 is closed if $e_{out}$ is greater than $e_{in}$; consequently for a decreasing input signal, indicative of a decrease in altitude, the switch is closed and the output follows the input. The switch 16 is open if $e_{out}$ is smaller than $e_{in}$; consequently if the input signal is increasing, indicative of an increase in altitude, the switch is open, however, the voltage across the capacitor 30 remains substantially constant since the isolation amplifier 34 is chosen so as to have a very high input impedance.

After the signal passes the lag network, it enters the amplifier 34. The output is isolated by the field effect transistor 56 which sends an indicative signal via line 58 to the integrated amplifying circuit 60. A constant current source is shown at 62 which enters the integrated circuit 60 via line 59. The output of the integrated circuit is in the form of a difference voltage provided to point 22 for feedback to amplifier 20 and as output $e_{out}$ to the readout 36.

The switch 16 is controlled by the very high gain differential amplifier 20. The output of the amplifier is saturated at a logical zero or at a logical one level based on whether the input $e_{in}$ from the sensing unit 10 is smaller or larger than the output $e_{out}$ from the isolation amplifier 34. If $e_{in}$ is smaller than $e_{out}$, the output of the amplifier 20 is a zero. If $e_{in}$ is larger than $e_{out}$, the output of the amplifier is a logical one. The voltage controlled switch, 16, is closed if its control input is a logical zero and open if its control input is a logical one. Therefore, the switch is closed if $e_{in}$ is smaller than $e_{out}$ and open if $e_{in}$ is larger than $e_{out}$.

Having thus described our apparatus for radar altimeter in clear and sufficient detail we claim specifically as our invention the following:

1. A device of the class described comprising: a sensor; a switch means having a first terminal, a second terminal, and a third terminal wherein electrical conditions at the third terminal render the path from the first to the second terminal conductive or non-conductive; a lag network; an isolation amplifier; means coupling the output of the sensor to the first terminal of the switch means; means coupling the output at the second terminal of the switch means to an input of the lag network; means coupling output signals from the lag network to an input of the isolation amplifier; readout means responsive to the output of the isolation amplifier; a differential amplifier responsive to the output of the sensor and to the output of the isolation amplifier and producing an output signal representative of the difference between the output of the sensor and the output of the isolation amplifier; a diode coupling the output of the differential amplifier to the third terminal of the switch means to render the pathway from the first terminal to the second terminal conductive when the output of the differential amplifier is of a first polarity and non-conductive when the output of the differential amplifier is of a second polarity.

* * * * *